(12) United States Patent
Pashkovsky et al.

(10) Patent No.: US 10,897,798 B2
(45) Date of Patent: Jan. 19, 2021

(54) METHOD OF REDUCING LIGHT POLLUTION OF ASTRONOMICAL INSTRUMENTS BY OUTDOOR ILLUMINATION DEVICES

(71) Applicant: Vladimir Eliich Pashkovsky, St. Petersburg (RU)

(72) Inventors: Vladimir Eliich Pashkovsky, St. Petersburg (RU); Sergey Anatolievich Logvinov, St. Petersburg (RU)

(73) Assignee: Vladimir Eliich Pashkovsky, St. Petersburg (RU)

( * ) Notice: Subject to any disclaimer, the term of this patent is extended or adjusted under 35 U.S.C. 154(b) by 0 days.

(21) Appl. No.: 16/623,822

(22) PCT Filed: Jul. 16, 2018

(86) PCT No.: PCT/RU2018/000464
§ 371 (c)(1),
(2) Date: Dec. 18, 2019

(87) PCT Pub. No.: WO2019/039967
PCT Pub. Date: Feb. 28, 2019

(65) Prior Publication Data
US 2020/0214100 A1  Jul. 2, 2020

(30) Foreign Application Priority Data
Aug. 24, 2017  (RU) .................................. 2017130101

(51) Int. Cl.
*H05B 45/12* (2020.01)
*G02B 23/00* (2006.01)
(Continued)

(52) U.S. Cl.
CPC .............. *H05B 45/12* (2020.01); *F21S 8/085* (2013.01); *F21S 10/06* (2013.01); *G02B 23/00* (2013.01);
(Continued)

(58) Field of Classification Search
CPC ........ H05B 47/11; H05B 47/14; H05B 45/12; F21S 8/085; F21S 10/06; G02B 23/00; G03B 9/62
See application file for complete search history.

(56) References Cited

U.S. PATENT DOCUMENTS 7,828,463 B1 *  11/2010  Willis .................... F21S 8/086
                                                       362/276
2004/0223075 A1 *  11/2004  Furlan .................... H04N 5/238
                                                       348/363
(Continued)

FOREIGN PATENT DOCUMENTS

| RU | 2235666 C2 | 8/2003 |
| RU | 2294846 C2 | 1/2004 |
| RU | 2536179 C2 | 5/2007 |

OTHER PUBLICATIONS

Translation of RU2294846 (Year: 1999).*
(Continued)

*Primary Examiner* — Amy Cohen Johnson
*Assistant Examiner* — Syed M Kaiser
(74) *Attorney, Agent, or Firm* — Bardmesser Law Group

(57) ABSTRACT

The invention relates to a field of outdoor (street) illumination, in particular, to methods of controlling light emission, as well as to a field of optical devices, in particular, to methods of reducing light pollution that affects astronomical instruments. The method of reducing impact of light of outdoor illumination devices on astronomical instruments consists in generating a light flow of illumination devices in a form of periodical pulses and in blocking the light flow (Continued)

directed to a light-sensitive matrix of an astronomical instrument during arrival of the light flow pulses of the outdoor illumination devices. Thus, light pollution of astronomical instruments by outdoor illumination devices is avoided.

18 Claims, 2 Drawing Sheets

(51) Int. Cl.
    *H05B 47/11*      (2020.01)
    *F21S 8/08*       (2006.01)
    *F21S 10/06*      (2006.01)
    *G03B 9/62*       (2006.01)
    *F21Y 115/10*     (2016.01)

(52) U.S. Cl.
    CPC ............... *G03B 9/62* (2013.01); *H05B 47/11* (2020.01); *F21Y 2115/10* (2016.08)

(56) References Cited

U.S. PATENT DOCUMENTS

| | | | | |
|---|---|---|---|---|
| 2008/0077360 A1* | 3/2008 | DeBoer | ................. | G04C 23/26 |
| | | | | 702/188 |
| 2010/0065625 A1* | 3/2010 | Sabeta | ................. | G06K 19/077 |
| | | | | 235/376 |
| 2011/0001626 A1* | 1/2011 | Yip | ........................ | H05B 47/16 |
| | | | | 340/635 |
| 2012/0306382 A1* | 12/2012 | Maxik | ................. | F21V 23/0471 |
| | | | | 315/152 |
| 2013/0140995 A1* | 6/2013 | Jones | .................... | H05B 47/11 |
| | | | | 315/151 |
| 2014/0168634 A1* | 6/2014 | Kameyama | ........... | G01S 17/933 |
| | | | | 356/5.01 |
| 2014/0316196 A1* | 10/2014 | Wichern | ............... | A61B 1/0661 |
| | | | | 600/109 |
| 2015/0173156 A1* | 6/2015 | Pedersen | ................ | H05B 47/11 |
| | | | | 315/151 |
| 2015/0247620 A1* | 9/2015 | Thompson, III | ........ | F21V 11/16 |
| | | | | 362/244 |
| 2016/0050369 A1* | 2/2016 | Takenaka | ............. | G06T 3/4038 |
| | | | | 348/222.1 |
| 2016/0259057 A1* | 9/2016 | Ito | ........................... | H04N 9/045 |
| 2016/0273726 A1* | 9/2016 | Adler | ....................... | F21S 11/00 |
| 2016/0360082 A1* | 12/2016 | Nakao | .................. | H04N 5/2353 |
| 2017/0131718 A1* | 5/2017 | Matsumura | ............ | G05D 1/021 |
| 2017/0163918 A1* | 6/2017 | Chen | .................... | H04N 5/2254 |
| 2018/0283666 A1* | 10/2018 | Beausoleil | ............ | F21V 21/116 |

OTHER PUBLICATIONS

Patentability report in PCT/RU2018/000464, dated Nov. 29, 2018.
Mamaev S., Pulsatsii osveschennosti: problemy, metrologiya i 2 raschet, Lumen&Expertunion, NQ3, 2013, razdel Pulsatsii osveschennosti i ikh vliyanie na organizm cheloveka. Found Nov. 21, 2018b Found on the Internet http://www.umen2b.ru/lumen-3-2013/.
Svetovoe zagryaznenie. Fon neba i zasvetka. May 8, 2014, Found 1-2,4-7 Nov. 21, 2018, retrieved from the Internet http://www.astroclub.kiev.ua/forum/index.php?topic=35838.

\* cited by examiner

METHOD OF REDUCING LIGHT POLLUTION OF ASTRONOMICAL INSTRUMENTS BY OUTDOOR ILLUMINATION DEVICES

CROSS REFERENCE TO RELATED APPLICATIONS

This application is a US National Phase of PCT/RU2018/000464, filed on 16 Jul. 2018, which claims priority to RU 2017130101, filed on 24 Aug. 2017, which are both incorporated herein by reference in their entirety.

FIELD OF THE INVENTION

The invention relates to a field of outdoor (street) illumination, in particular, to methods of controlling light emission, as well as to a field of optical devices, in particular, to methods of reducing light pollution that affects astronomical instruments.

PRIOR ART

Outdoor illumination is one of major sources of atmosphere light pollution near cities, motorways and industrial sites. The light pollution substantially complicates operations of observatories operable in optical range of frequencies. For example, the Royal Greenwich Observatory ceased on-site observations a long time ago due to its location in London. Similar problems are typical for many other observatories located near large cities or industrial sites.

There are two main solutions of avoiding light pollution by outdoor illumination.

According to the first solution, illumination is provided using special illuminating equipment that forms a downwardly directed light flow. Such a light flow illuminates pavements and roadways, but does not illuminate the sky (e.g., U.S. Pat. Nos. 5,599,091, 7,083,307, 7,217,007, 7,264,380, US20080285284).

Disadvantage of such solutions is low illuminance of other publicly available sites, which may be unacceptable in view of comfort in residential and public areas. In particular, this solution is unsuitable for external illumination of buildings and structural facilities, light signs and outdoor displays. Moreover, a light portion reflected by pavements and roadways also illuminates the sky and causes light pollution, though to a smaller extent, than in case of direct illumination of the sky.

The second solution is using monochromatic or near monochromatic light. Usually, gas discharge low-pressure sodium lamps are used, which have quite narrow emission spectrum. The narrow spectrum band may be easily rejected by optical or digital methods.

Disadvantages of this solution are that this kind of light is not comfortable for people, and that it cannot be used for light signs and some kinds of illumination.

SUMMARY OF THE INVENTION

The technical result of the invention is reducing light pollution caused by outdoor illumination devices, which affects astronomical instruments.

The method of reducing impact of light of outdoor illumination devices on astronomical instruments includes generating a flow of light of the illumination devices in a form of periodical pulses and in blocking the light flow directed to a light-sensitive matrix of an astronomical instrument during arrival of the light flow pulses of the outdoor illumination devices.

In particular, the light flow is formed as periodical pulses having frequency of 300-1000 Hz and a duty ratio of 2 to 10.

Moreover, periodical pulses of each of the illumination devices located at different distances from the astronomical instrument are formed with different time shifts so that the light pulses of different light sources arrive simultaneously at the astronomical instrument.

The light flow is formed using LED light sources.

In particular, the light flow is formed based on synchronization signals using standard time signals received from a public system of broadcasting standard time signals.

Additionally, the light flow is formed based on synchronization signals transmitted via a wire communication line.

The light flow directed to the light-sensitive matrix of the photodetector is blocked using a shutter.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Reference will now be made in detail to the preferred embodiments of the present invention, examples of which are illustrated in the accompanying drawings.

The invention uses separation of time of operation of an illumination system and time when a light flow may be passed to a light-sensitive matrix of an astronomical instrument photodetector. It is proposed to provide outdoor illumination by a pulsed light source. When pulses of the light flow arrive from the outdoor illumination devices, accumulation of information in the photodetector is interrupted by a special shutter. The shutter may be external (e.g., electronic, electrooptical or electromechanical) or internal (implemented by feeding corresponding electric potentials to control electrodes of the photodetector).

The Frequency of interruption must exceed 300 Hz, as pulses having frequency of above 300 Hz are not perceived by eyesight of humans.

All illumination devices must be synchronized so that (a) they emit light pulses of the same frequency and the same duration and (b) they are switched on and off with a time shift relative to each other so that their light pulses coincide when coming into the photodetector.

As the illumination devices are located at different distances from the photodetector, time of light travelling from a certain illumination device to the photodetector may differ by tens of microseconds (light travels 1 km in 3.3 microseconds). To provide that, power sources should be equipped with adjustable synchronization and delay devices. Light flow pulses are synchronized by a standard time signal received via GPS, GLONASS or some other publicly available system providing standard time signals.

Figure 1:
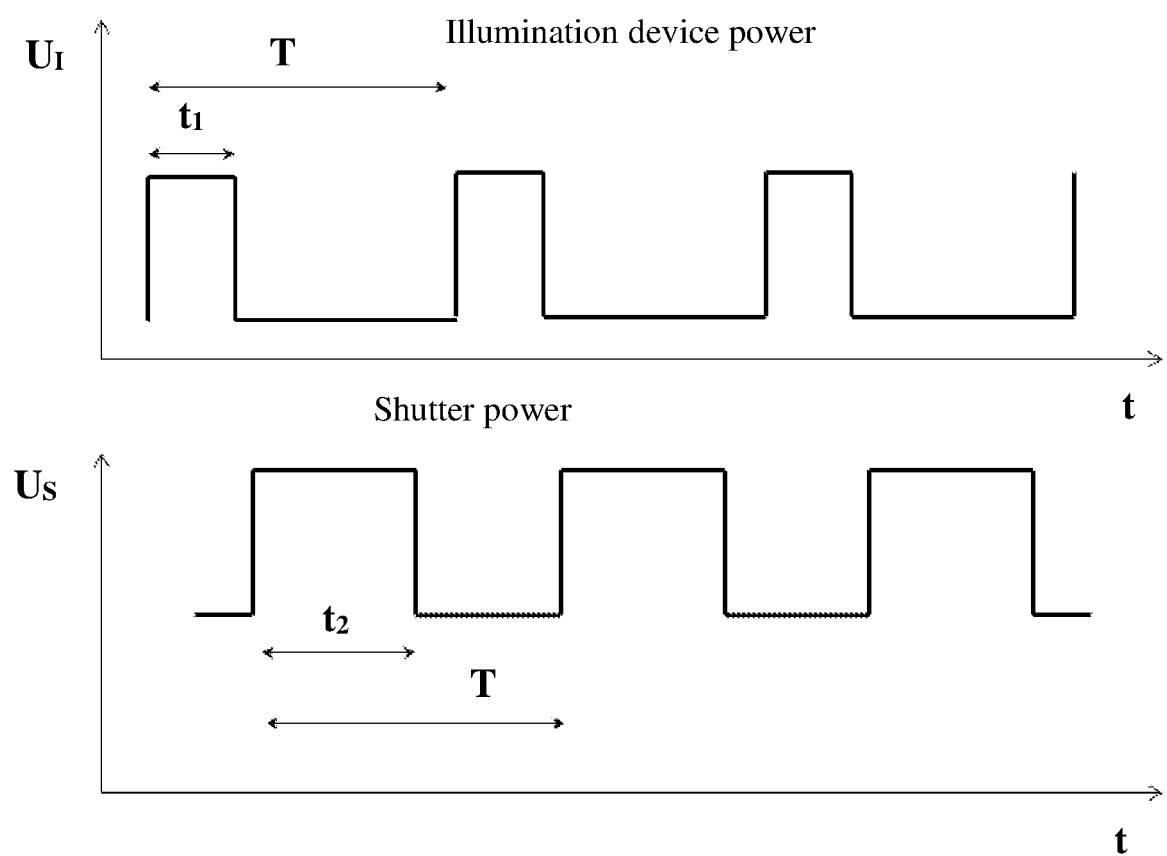
FIG. 1 is a timing diagram of emitting a light flow by outdoor illumination devices and blocking the light flow by a photodetector shutter of an astronomical instrument.

Power $U_1$ of the illumination devices is on during time period $t_1$ (FIG. 1). Duty ratio of the power pulses (i.e., ratio of T to $t_1$) is in range of 2 to 10. During this time, power $U_S$ of the shutter is off.

After the illumination devices are powered off, the telescope shutter is powered on by $U_S$. During this time, power $U_1$ of the illumination devices is off.

Figure 2:
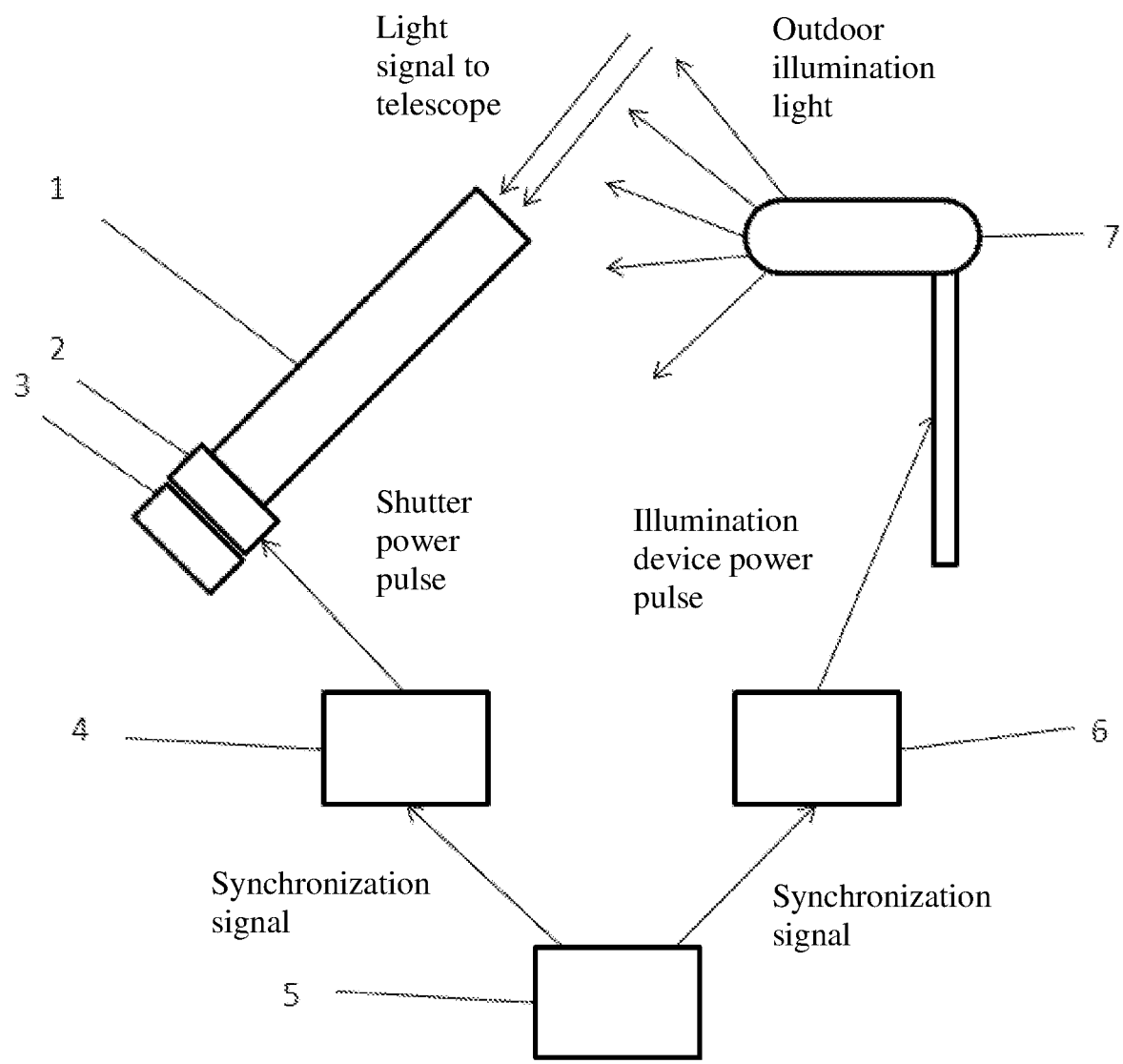
FIG. 2 is a block diagram illustrating an embodiment of the claimed method.

A block diagram illustrating an embodiment of the claimed method is represented in FIG. 2. The following components are shown in the diagram.

1 Astronomical instrument
2 Shutter
3 Light-sensitive matrix of astronomical instrument
4 Pulsed power source of shutter
5 Synchronization signal source
6 Pulsed power source of illumination device
7 Illumination device After the telescope shutter is powered off, the illumination devices are powered on.

Cycle duration T of pulses of the both power sources is the same and it does not exceed 3 milliseconds, preferably 1-2 milliseconds.

Synchronization of power pulses of all power sources is ensured by adjustable synchronization and delay devices. As a source of the synchronization signal, either a special source of a periodical signal having accuracy of not less than 10 microseconds, preferably not less than 1 microsecond, or a standard time signal received via GPS, Glonass or other publicly available system providing standard time signals may be used.

INDUSTRIAL APPLICABILITY

The invention may be implemented in modern astronomical instruments by way of modified control of outdoor illumination devices having LED light sources.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A method of reducing light pollution to an astronomical instrument by outdoor illumination devices, the method comprising:
generating a light flow of the outdoor illumination devices in a form of periodical pulses; and
interrupting, by a shutter, accumulation of information in a light-sensitive matrix of the astronomical instrument during arrival of the periodical pulses from the outdoor illumination devices, and accumulating information in the light-sensitive matrix only when the shutter permits the light-sensitive matrix to receive light.

2. The method of claim 1, wherein the periodical pulses have a frequency of 300-1000 Hz and a duty ratio of 2 to 10.

3. The method of claim 1, wherein the periodical pulses of each light source of the outdoor illumination devices located at different distances from the astronomical instrument are generated with different time shifts so that the periodical pulses of different light sources arrive simultaneously at the astronomical instrument.

4. The method of claim 1, wherein the light flow is generated using LED light sources.

5. The method of claim 1, wherein the light flow is generated based on synchronization signals using standard time signals received from a public system of broadcasting standard time signals.

6. The method of claim 1, wherein the light flow is generated based on synchronization signals generated by a satellite source.

7. The method of claim 1, wherein the light flow is generated based on synchronization signals transmitted via a wire communication line.

8. The method of claim 1, wherein the light flow is generated based on synchronization signals transmitted via a fiber optic communication line.

9. The method of claim 1, wherein the shutter is controlled based on standard time signals received from a public system of broadcasting standard time signals.

10. The method of claim 1, wherein the shutter is controlled based on synchronization signals generated by a satellite source.

11. The method of claim 1, wherein the shutter is controlled based on synchronization signals transmitted via a wire communication line.

12. The method of claim 1, wherein the shutter is controlled based on synchronization signals transmitted via a fiber optic communication line.

13. The method of claim 1, wherein the shutter is external to the astronomical instrument.

14. The method of claim 1, wherein the shutter is a part of the astronomical instrument.

15. The method of claim 1, wherein the shutter is an electronic shutter.

16. The method of claim 1, wherein the shutter is an electro-optical shutter.

17. The method of claim 1, wherein the shutter is an electromechanical shutter.

18. A system for reducing light pollution to an astronomical instrument, the system comprising:
an astronomical instrument including a light-sensitive matrix;
a shutter coupled to the astronomical instrument; and
a plurality of outdoor illumination devices generating a light flow in a form of pulses; and
wherein the shutter interrupts the light flow to the light-sensitive matrix, so that accumulation of information in a light-sensitive matrix when the outdoor illumination devices are turned on by an external synchronization signal, and wherein the information is accumulated in the light-sensitive matrix only when the shutter permits the light-sensitive matrix to receive light.

* * * * *